United States Patent
Tian et al.

(10) Patent No.: US 10,580,105 B2
(45) Date of Patent: Mar. 3, 2020

(54) CONTAINER ACCESS TO GRAPHICS PROCESSING UNIT RESOURCES

(71) Applicant: Intel Corporation, Santa Clara, CA (US)

(72) Inventors: Kun Tian, Shanghai (CN); Yao Zu Dong, Shanghai (CN); Zhiyuan Lv, Beijing (CN)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 15/570,256

(22) PCT Filed: May 29, 2015

(86) PCT No.: PCT/CN2015/080213
§ 371 (c)(1),
(2) Date: Oct. 27, 2017

(87) PCT Pub. No.: WO2016/191908
PCT Pub. Date: Dec. 8, 2016

(65) Prior Publication Data
US 2018/0293700 A1    Oct. 11, 2018

(51) Int. Cl.
*G06T 1/20* (2006.01)
*G06F 9/455* (2018.01)
(Continued)

(52) U.S. Cl.
CPC ............... *G06T 1/20* (2013.01); *G06F 9/455* (2013.01); *G06F 9/4881* (2013.01);
(Continued)

(58) Field of Classification Search
CPC . G06T 1/20; G06T 1/60; G06F 9/4881; G06F 9/5027; G06F 9/455; G06F 9/4411
(Continued)

(56) References Cited

U.S. PATENT DOCUMENTS 8,341,624 B1 * 12/2012 Hobbs ................... G06F 9/5011
709/204
2010/0262722 A1   10/2010 Vauthier et al.
(Continued)

FOREIGN PATENT DOCUMENTS

| CN | 104360896 A | 2/2015 |
|---|---|---|
| WO | WO2014/131171 A1 | 9/2014 |
| WO | WO2015000106 A1 | 1/2015 |

OTHER PUBLICATIONS

International Search Report and Written Opinion dated Feb. 29, 2016 for International Application No. PCT/CN2015/080213, 11 pages.
(Continued)

*Primary Examiner* — Ke Xiao
*Assistant Examiner* — Kim Thanh T Tran
(74) *Attorney, Agent, or Firm* — Schwabe, Williamson & Wyatt, P.C.

(57) ABSTRACT

Systems and methods for container access to graphics processing unit (GPU) resources are disclosed herein. In some embodiments, a computing system may include a physical GPU and kernel-mode driver circuitry, to communicatively couple with the physical GPU to create a plurality of emulated GPUs and a corresponding plurality of device nodes. Each device node may be associated with a single corresponding user-side container to enable communication between the user-side container and the corresponding emulated GPU. Other embodiments may be disclosed and/or claimed.

22 Claims, 6 Drawing Sheets

(51) Int. Cl.
*G06F 9/48* (2006.01)
*G06F 9/50* (2006.01)
*G06T 1/60* (2006.01)
*G06F 9/4401* (2018.01)

(52) U.S. Cl.
CPC .............. *G06F 9/5027* (2013.01); *G06T 1/60* (2013.01); *G06F 9/4411* (2013.01)

(58) Field of Classification Search
USPC ....................................................... 345/522
See application file for complete search history.

(56) References Cited

U.S. PATENT DOCUMENTS

| | | | |
|---|---|---|---|
| 2011/0021232 A1* | 1/2011 | Kazmi | H04L 5/0007 455/509 |
| 2013/0091500 A1 | 4/2013 | Earl et al. | |
| 2014/0172964 A1* | 6/2014 | Lyons | A63F 13/12 709/203 |
| 2014/0337835 A1* | 11/2014 | Johnson | G06F 9/45558 718/1 |
| 2014/0373005 A1 | 12/2014 | Agrawal et al. | |

OTHER PUBLICATIONS

Kun Tian et al., "A Full GPU Virtualization Solution with Mediated Pass-Through", Jun. 19-20, 2014, 13 pages, 2014 USENIX Annual Technical Conference, Philadelphia, PA.

Kevin Tian, "Xen—Graphics Virtualization (XenGT)", 2013, 4 pages, https://01.org/xen/blogs/srclarkx/2013/graphics-virtualization-xengt.

"Nvidia Grid Technology", http://www.nvidia.com/object/grid-technology.html; retrieved on Apr. 23, 2015, 2 pages.

Zhiyuan Lv et al., "XenGT: A Full GPU Virtualization Solution with Mediated Pass-Through", Mar. 27, 2014, 33 pages.

Extended European Search Report dated Jan. 21, 2019 for European Patent Application No. 15893572.6, 10 pages.

* cited by examiner

CONTAINER ACCESS TO GRAPHICS PROCESSING UNIT RESOURCES

CROSS REFERENCE TO RELATED APPLICATIONS

The present application is a national phase entry under 35 U.S.C. § 371 of International Application No. PCT/CN2015/080213, filed May 29, 2015, entitled "CONTAINER ACCESS TO GRAPHICS PROCESSING UNIT RESOURCES", which designated, among the various States, the United States of America. The Specification of the PCT/CN2015/080213 Application is hereby fully incorporated by reference.

FIELD

Embodiments of the present disclosure generally relate to the field of computing systems, and more particularly, to container access to graphics processing unit resources.

BACKGROUND

Containers have been used to access non-graphics processing unit (GPU) computing resources, such as central processing unit (CPU) resources, memory and storage, and network functions. However, the unique issues involved in the use of containers in GPU-heavy applications have left GPU containerization an open challenge.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
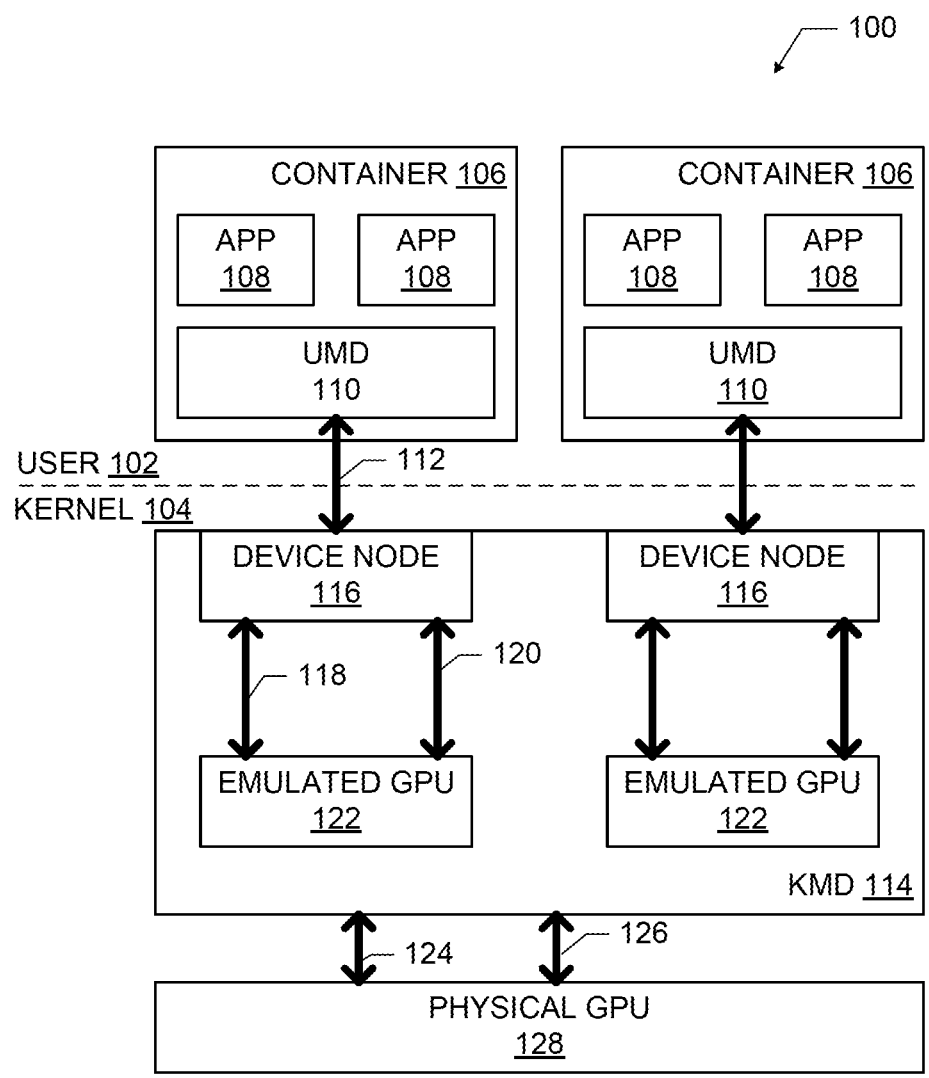
FIG. 1 is a block diagram of a computing system including a container communicatively coupled with an emulated GPU, in accordance with various embodiments.

Disclosed herein are systems and methods for container access to graphics processing unit (GPU) resources. For example, in some embodiments, a method for enabling a plurality of user-side containers to utilize resources of a physical GPU may include providing a kernel-mode driver to create multiple emulated GPUs and corresponding device nodes, wherein the plurality of emulated GPUs are communicatively coupled to a physical GPU; and associating each device node with a single corresponding user-side container to enable communication between the user-side container and the corresponding emulated GPU to utilize resources of the physical GPU.

Various ones of the embodiments disclosed herein may provide GPU acceleration in containers through driver self-emulation. Containers, also referred to as "software containers," provide operating system-level virtualization in a computing system. Systems that utilize containers instead of traditional virtual machines (VMs) may exhibit higher density, faster provisioning, and better performance, making containers a strong lightweight alternative to virtualization technology in certain applications.

As noted above, containers have been used to access non-GPU computing resources, such as central processing unit (CPU) resources, memory and storage, and network functions. These subsystems are managed by the kernel, and typically have well-abstracted resources and a simple interface exposed to the user side of the computing system. In particular, different namespaces may give each user-side process a separate view of the system, isolated from other processes and including separate mount points, process identifiers (PIDs), interprocess communication (IPC), network resources, and time resources, among others. The result is that the namespace enables the containerization of these non-GPU computing resources for an individual user. The "cgroup" functionality in the Linux kernel limits, accounts for, and isolates resource usage of multiple processes, and may further enforce resource limitation, prioritization, accounting, and control among different namespaces. Consequently, multiple containers may be well isolated.

However, the unique issues involved in the use of containers in GPU-heavy applications have been an open challenge. In particular, the complex interface between the kernel-mode driver (KMD) and the user-mode driver (UMD) of a GPU has meant that a graphics subsystem is much more complex than the subsystems discussed above. Interfaces and graphics subsystems are usually vendor-specific, so the resources exposed to the UMD are poorly abstracted, requiring more options to be specified than with the subsystems discussed above by orders of magnitude. For example, a typical graphics driver in Linux may include approximately 70 common direct rendering manager (DRM) input/output control (IOCTL) options and approximately 40 vendor-specific IOCTL options. Each IOCTL leads to complex code paths in the graphics driver, which finally translate to thousands of registers in the GPU. Creating a namespace or utilizing cgroup for such a large interface and set of device attributes requires a very detailed, intrusive, and device-specific set of modifications touching almost every code path/data structure within a KMD. This is a tremendous amount of engineering effort, and may present an almost unmanageable maintenance burden. Moreover, the ability to port a solution for one GPU to another GPU is limited or nonexistent.

These challenges have limited or precluded the use of containers in graphics-intensive scenarios. These scenarios may include the use of multiple personalities and client devices (e.g., personal computer, phone, tablet); remote desktops or workstations running GPU-intensive computer aided drafting (CAD) software; media delivery cloud applications that provide media transcoding, videoconference, clouds set-top box, or other software as a service; cloud gaming; and visual understanding (e.g., face recognition, deep learning, etc.). Some of these scenarios may require full GPU capabilities (e.g., three-dimensional graphics, video, and GPU computations), and others of these scenarios may require only part of the capabilities of a GPU. Conventionally, hypervisor-based virtualization (e.g., running a whole operating system in a virtual machine) is used in these scenarios.

At best, "containerization" has been attempted only by exclusively assigning a physical GPU to a single container without the ability of multiple containers to share the resources of that GPU. Some previous approaches have attempted to run applications in multiple containers, and have these applications access GPU resources, but the applications of the different containers have not been isolated from each other and thereby present a significant security risk.

Some of the embodiments disclosed herein provide container graphics in a secure, isolated manner enabling good quality of service (QOS) control. In particular, a driver self-emulation approach is disclosed herein in which multiple emulated GPU instances may be generated. Each GPU instance may be securely isolated and dedicated when used by a user-side container. This may enable GPU acceleration in containers with robust isolation in both security and performance. Using the approach disclosed herein, the difficulty of containerizing a UMD with a complex interface to a KMD is eliminated; instead, emulated GPUs may be containerized and communicate with a physical GPU using known techniques.

In some embodiments, an emulated GPU in a computing system may be generated by the KMD. The emulated GPU may have the same features as a physical GPU in the computing system. Each emulated GPU may be associated with a unique device node that is exclusively owned by a single container on the user side. The same driver code may run on top of an emulated GPU and the physical GPU (e.g., with substantially identical low-level input/output hooks). Secure isolation may be centrally enforced at the emulated GPU level (e.g., in a self-emulator). Each container can only access its own emulated GPU, so strict isolation can be achieved. Performance isolation may be enforced when emulated GPU issues GPU commands to a scheduler, which can then extend existing QOS policy enforcement techniques to the applications in the container. Various ones of these and other embodiments are discussed in detail herein.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. As used herein, the terms "driver" and "driver circuitry" may include circuitry programmed or otherwise structured to operate and/or control a particular hardware device (e.g., a graphics processing unit).

FIG. 1 is a block diagram of a computing system 100 including a plurality of containers 106 on the user side 102. Each of the containers 106 is communicatively coupled with an emulated GPU 122 on the kernel side 104 of the computing system 100. Each container 106 may include a user-mode GPU driver (UMD) 110 and one or more software applications 108 in communication with the UMD 110. A UMD 110 may communicate with an emulated GPU 122 of a kernel-mode GPU driver (KMD) 114 via a UMD-KMD interface 112 and a device node 116 (e.g., /dev/dri/card0 or another card number in a Linux system). The KMD 114 may be communicatively coupled to a physical GPU 128. The device node 116 may exchange control data over a control path 118 (e.g., mode setting, resolution, cache mode, etc.) and render data over a render path 120 (e.g., through a command buffer containing GPU commands to be parsed by a GPU) with the emulated GPU 122. In turn, the KMD 114 may exchange control data over a control path 124 and render data over a render path 126 with the physical GPU 128. In some embodiments, the control path 124 and the render path 126 may duplex and share a common path.

Any of a number of known techniques may be used to generate the emulated GPU 122. For example, approaches like XenGT have been used to enable GPU acceleration in a VM by generating a full emulated GPU device model in a Linux graphics driver. This GPU device model may be used to provide the emulated GPU 122, and may be readily ported to any operating system. Using the XenGT approach, the operation of the emulated GPU 122 may be expected to be close to native performance for typical graphics workloads, an almost identical to native performance for typical media workloads. Additionally, the trap overhead incurred during hypervisor usage is avoided by using containers instead of VMs (since containers can directly call into the emulated GPU device model from the driver code). Although XenGT is discussed above, any suitable existing GPU device model may be used to generate the emulated GPU, and thus techniques for generating an emulated GPU are not discussed further herein.

The KMD 114 may be configured to create the one or more emulated GPUs 122 and the corresponding one or more device nodes 116. In use, each device node 116 may be associated with a single corresponding user-side container 106, and may enable communication between the user-side container 106 and the corresponding emulated GPU 122 to allow the one or more applications 108 of the user-side container 106 to utilize the graphics processing resources of the physical GPU 128.

In some embodiments, the computing system 100 may include a graphics memory (not shown) partitioned among multiple emulated GPUs 122. The graphics memory may be utilized for pixel loading or as a write command buffer, for example. In other embodiments, the graphics memory for the emulated GPUs 122 may be dynamically and centrally allocated in the KMD 114 (e.g., as is conventionally done for host applications).

In some embodiments, the emulated GPU 122 may emulate the physical GPU 128. In some embodiments, the emulated GPU 122 may support a set of features that is a proper subset of the features supported by the physical GPU 128. For example, the emulated GPU 122 may represent a GPU that is "simplified" relative to the physical GPU 128 (e.g., exposing fewer features to the user space than the physical GPU 128). In some embodiments, the emulated GPU 122 does not emulate the physical GPU 128; examples of such embodiments are discussed below with reference to FIG. 4.

Figure 2:
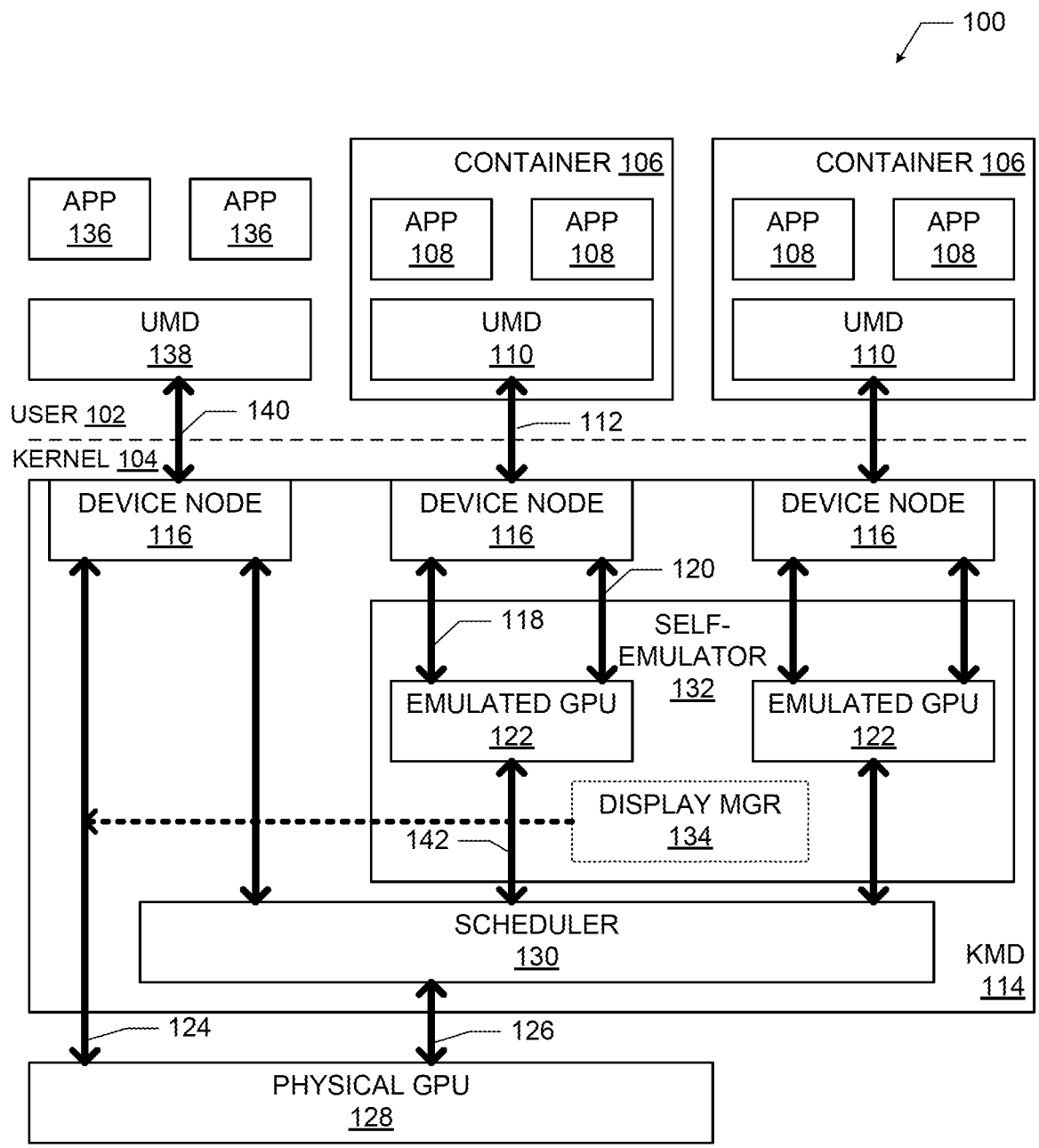
FIG. 2 is a block diagram of an embodiment of the computing system of FIG. 1 having a display manager and a scheduler, in accordance with various embodiments.

FIG. 2 is a block diagram of an embodiment of the computing system 100 of FIG. 1 having a display manager 134 and a scheduler 130, in accordance with various embodiments. As discussed above with reference to FIG. 1, the computing system 100 of FIG. 2 includes a plurality of containers 106 on the user side 102, each communicatively coupled with an emulated GPU 122 on the kernel side 104. Each container 106 may include a user-mode GPU driver (UMD) 110 and one or more software applications 108 in communication with the UMD 110. The UMD 110 may in turn communicate with an emulated GPU 122 of a KMD 114 via a UMD-KMD interface 112 and a device node 116. As noted above with reference to FIG. 1, the KMD 114 may be communicatively coupled to a physical GPU 128. The device node 116 may exchange control data over the control path 118 and render data over the render path 120 with the emulated GPU 122. In turn, the KMD 114 may exchange control data over the control path 124 and render data over the render path 126 with the physical GPU 128. The KMD 114 may be configured to create the one or more emulated GPUs 122 and the corresponding one or more device nodes 116. In use, each device node 116 may be associated with a single corresponding user-side container 106, and may enable communication between the user-side container 106 and the corresponding emulated GPU 122 to allow the one or more applications 108 of the user-side container 106 to utilize the graphics processing resources of the physical GPU 128.

As shown in FIG. 2, the one or more emulated GPUs 122 may be included in a self-emulator 132, along with a display manager 134, of the KMD 114. The self-emulator 132 may be configured to generate a GPU device model to serve as the emulated GPU 122. In embodiments in which the emulated GPU 122 may be generated with the same or equivalent features as the physical GPU 128, the KMD for the physical GPU 128 (i.e., the KMD 114) is able to generate multiple driver instances to manage both the emulated GPUs 122 and the physical GPU 128. In some embodiments, the emulated GPU 122 may include exactly equivalent features as the physical GPU 128, and thus the same graphics driver can run seamlessly on both. Each driver instance may include its own device node 116, which may be exclusively assigned to a particular container 106, as discussed above. Minimal changes may be made to convert low-level driver input/output interfaces (e.g., i915_read/write IOCTLs) into callbacks directly into the emulated GPU 122. Each container 106 may be constrained to only access its own emulated GPU 122, and the self-emulator 132 may ensure that an emulated GPU 122 can't interfere with other emulated GPUs 122 (e.g., by controlling a CPU page table mapping and scanning GPU commands).

The computing system 100 may also include one or more applications 136 and a UMD 138 that are not included in a software container. The applications 136 may communicate with the UMD 138, which may in turn communicate with the device node 116 of the KMD 114 via a UMD-KMD interface 140. The device node 116 may then exchange control data with the physical GPU 128 and render data with the scheduler 130 in accordance with conventional techniques (e.g., without going through an emulated GPU). Thus, a computing system 100 may accommodate both containerized and non-containerized applications (simultaneously or at different times) in utilizing the resources of the physical GPU 128.

The KMD 114 may include a scheduler 130. The scheduler 130 may be communicatively coupled with the emulated GPUs 122 and the physical GPU 128. The scheduler 130 may provide render data over the render path 142. The scheduler 130 may provide a command submission interface for the emulated GPUs 122 and may implement cgroup or similar functionality. In some embodiments, the scheduler 130 may be configured to enforce a quality of service policy on use of the physical GPU 128 by the emulated GPUs 122 by applying a cgroup policy in a similar manner as conventionally performed for host applications). For example, a quality of service policy may include different weights allocated to different ones of the emulated GPUs 122, based on service level agreements reached between end user and a cloud service provider about the container capability. The scheduler 130 may then schedule commands from each emulated GPU 122 based on the allocated weights (e.g., with a particular emulated GPU 122 being allocated a percentage of resources based on its percentage of the total weight), or using any suitable conventional technique for quality of service scheduling. In some embodiments, the scheduler 130 may be configured to enforce a secure isolation policy for the emulated GPUs 122. As used herein, an "isolation policy" may refer to a stored set of requirements regarding the allowable interaction and/or exposure of the operation of one emulated GPU 122 to another emulated GPU 122.

The self-emulator 132 of the KMD 114 may include a display manager 134. The display manager 134 may couple with frame buffers (not shown) of each of the plurality of user-side containers 106 to selectively bring different ones of the frame buffers to the control path 124 for the physical GPU 128. This feature may be particularly advantageous in settings in which each of multiple containers 106 runs a full graphics stack (e.g., including x-server and a window manager). Such settings may occur in tablet and phone virtualization, or In-Vehicle Infotainment (IVI) virtualization. When a user wishes to switch from viewing the content of a first container to viewing the content of a second container, the second container may be brought to the "foreground" by bringing the frame buffer of the second container to the control path 124 for the physical GPU 128 (and the first container may be sent to the "background" by decoupling the frame buffer from the control path 124). Frame buffers may be brought to the control path 124 via a full mode setting or through a frame buffer switch and panel fitting, for example (with the latter typically faster than the former).

As noted above with reference to FIG. 1, in some embodiments, the computing system 100 of FIG. 2 may include a graphics memory (not shown) partitioned among multiple emulated GPUs 122. The graphics memory may be utilized for pixel loading or as a write command buffer, for example. In some embodiments, the emulated GPU 122 of FIG. 2 may emulate the physical GPU 128. In some embodiments, the emulated GPU 122 may support a set of features that is a proper subset of the features supported by the physical GPU 128. In some embodiments, the emulated GPU 122 does not emulate the physical GPU; examples of such embodiments are discussed below with reference to FIG. 4.

Figure 3:
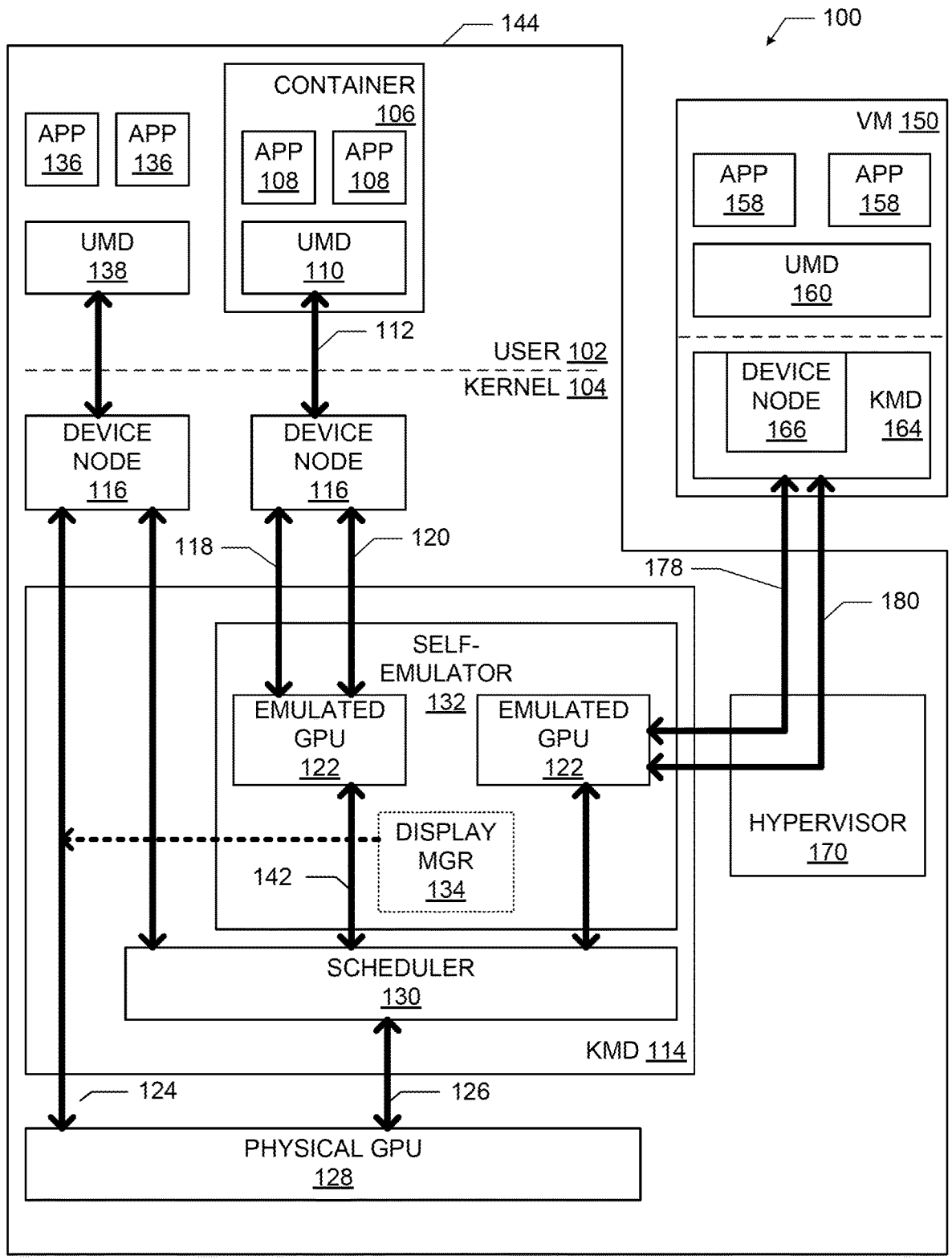
FIG. 3 is a block diagram of an embodiment of the computing system of FIG. 1 having a virtual machine communicatively coupled with an emulated GPU, in accordance with various embodiments.

FIG. 3 is a block diagram of an embodiment of the computing system 100 of FIG. 1 having a virtual machine (VM) 150 communicatively coupled with an emulated GPU 122, in accordance with various embodiments. The computing system 100 of FIG. 1 may be based on a Type-2 hypervisor model. As discussed above with reference to FIG. 1, the computing system 100 of FIG. 3 includes a plurality of containers 106 on the user side 102 of a host computing device 144, each communicatively coupled with an emulated GPU 122 on the kernel side 104. Each container 106 may include a user-mode GPU driver (UMD) 110 and one or more software applications 108 in communication with the UMD 110. The UMD 110 may in turn communicate with an emulated GPU 122 of a KMD 114 of the host computing device 144 via a UMD-KMD interface 112 and a device node 116. As noted above with reference to FIG. 1, the KMD 114 may be communicatively coupled to a physical GPU 128. The device node 116 may exchange control data over the control path 118 and render data over the render path 120 with the emulated GPU 122. In turn, the KMD 114 may exchange control data over the control path 124 and render data over the render path 126 with the physical GPU 128. The KMD 114 may be configured to create the one or more emulated GPUs 122 and the corresponding one or more device nodes (116. In use, each device node 116 may be associated with a single corresponding user-side container 106, and may enable communication between the user-side container 106 and the corresponding emulated GPU 122 to allow the one or more applications 108 of the user-side container 106 to utilize the graphics processing resources of the physical GPU 128. The one or more emulated GPUs 122 may be included in a self-emulator 132, along with a display manager 134, of the KMD 114 of the host computing device 144. The computing system 100 may also include one or more applications 136 and a UMD 138 that are not included in a software container of the host computing device 144, as discussed above with reference to FIG. 2. The KMD 114 may include a scheduler 130 and/or a display manager 134, which may take the form of any of the embodiments discussed above with reference to FIG. 2. As noted above with reference to FIG. 1, in some embodiments, the computing system 100 of FIG. 2 may include a graphics memory (not shown) partitioned among multiple emulated GPUs 122. The graphics memory may be utilized for pixel loading or as a write command buffer, for example. In some embodiments, the emulated GPU 122 of FIG. 2 may emulate the physical GPU 128. In some embodiments, the emulated GPU 122 may support a set of features that is a proper subset of the features supported by the physical GPU 128. In some embodiments, the emulated GPU 122 does not emulate the physical GPU; examples of such embodiments are discussed below with reference to FIG. 4.

As noted above, the computing system 100 of FIG. 3 may include a VM 150. The VM 150 may include one or more software applications 158 in communication with a UMD 160. The VM 150 may also include a KMD 164 having a device node 166. The UMD 160 may be in communication with the device node 166 in a similar manner as discussed above with reference to the UMD 110 and the device node 116. The VM 150 may be running on a hypervisor 170, which may be communicatively arranged between the VM 150 and the host computing device 144. In particular, the hypervisor 170 may be communicatively coupled to one of the emulated GPUs 122 and may facilitate the passing of control data over the control path 178 and render data over the render path 180 from the KMD 164 to the emulated GPU 122. Thus, the computing system 100 of FIG. 3 may accommodate both containerized and VM-based applications (simultaneously or at different times) in utilizing the resources of the physical GPU 128. This mixed usage or "hybrid" scenario provides new flexibility in configuring the computing system 100.

Figure 4:
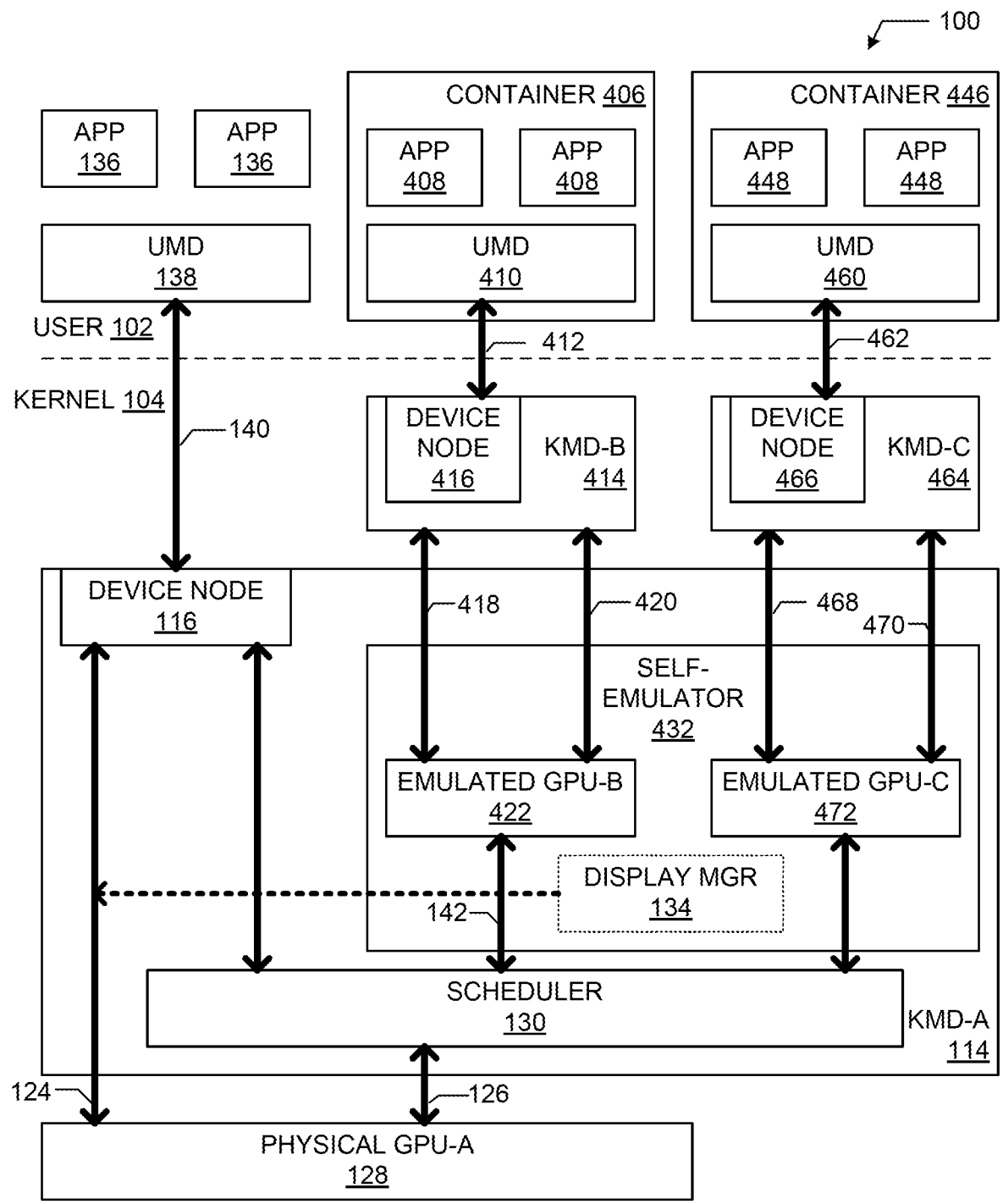
FIG. 4 is a block diagram of an embodiment of the computing system of FIG. 1 having multiple kernel-mode drivers, in accordance with various embodiments.

FIG. 4 is a block diagram of an embodiment of the computing system 100 of FIG. 1 having multiple kernel-mode drivers arranged in a "nested" configuration, in accordance with various embodiments. The computing system 100 of FIG. 4 includes a physical GPU designated as physical GPU-A 128. The computing system 100 of FIG. 4 also includes a container 406 on the user side 102 communicatively coupled with an emulated GPU designated as emulated GPU-B 422 on the kernel side 104. The computing system 100 of FIG. 4 also includes a container 446 on the user side 102 communicatively coupled with an emulated GPU designated as emulated GPU-C 472 on the kernel side 104. In the computing system 100 of FIG. 4, GPU-A, GPU-B, and GPU-C may represent different GPUs (e.g., GPUs with different capabilities and associated different drivers). The use of three different GPUs in the computing system 100 of FIG. 4 is simply illustrative, and any suitable number of GPUs may be used in accordance with the techniques discussed herein.

The container 406 may include a UMD 410 and one or more software applications 408 in communication with the UMD 410. The UMD 410 may communicate with a device node 416 of a KMD for emulated GPU-B 422 (designated as KMD-B 414) on the kernel side 104 via a UMD-KMD interface 412. As shown, the device node 416 may be disposed between the UMD 410 and the emulated GPU-B 422 along the communication pathway between the applications 408 and the physical GPU-A 128. The KMD-B 414 communicates with the emulated GPU-B 422 to exchange control data over the control path 418 and render data over the render path 420. The emulated GPU-B 422 may be included in a self-emulator 432 of a KMD for the physical GPU-A 128 (designated as KMD-A 114).

The container 446 may include a UMD 460 and one or more software applications 448 in communication with the UMD 460. The UMD 460 may communicate with a device node 466 of a KMD for emulated GPU-C 472 (designated as KMD-C 464) on the kernel side 104 via a UMD-KMD interface 462. As shown, the device node 466 may be disposed between the UMD 460 and the emulated GPU-C 472 along the communication pathway between the applications 448 and the physical GPU-A 128. The KMD-C 464 communicates with the emulated GPU-C 472 to exchange control data over the control path 468 and render data over the render path 470. The emulated GPU-C 472 may be included in the self-emulator 432 of the KMD-A 114.

As discussed above with reference to FIG. 1, the KMD-A 114 may be communicatively coupled to the physical GPU-A 128. The KMD-A 114 may exchange control data over the control path 124 and render data over the render path 126 with the physical GPU-A 128. The KMD-A 114 may be configured to create the one or more emulated GPUs (422 and 472) and the corresponding one or more device nodes (416 and 466). In use, each device node (416 and 466) may be associated with a single corresponding user-side container (406 and 446, respectively), and may enable communication between the user-side container (406 and 446, respectively) and the corresponding emulated GPU (422 and 472, respectively) to allow the one or more applications (408 and 448, respectively) of the user-side containers (406 and 446, respectively) to utilize the graphics processing resources of the physical GPU-A 128. The self-emulator 432 may include a display manager 134, as discussed above. The computing system 100 may also include one or more applications 136 and a UMD 138 that are not included in a software container of the host device 144, as discussed above with reference to FIG. 2. The KMD-A 114 may include a scheduler 130 and/or a display manager 134, which may take the form of any of the embodiments discussed above with reference to FIG. 2. As noted above with reference to FIG. 1, in some embodiments, the computing system 100 of FIG. 2 may include a graphics memory (not shown) partitioned among multiple emulated GPUs (e.g., the emulated GPUs 422 and 472). The graphics memory may be utilized for pixel loading or as a write command buffer, for example. In some embodiments, the emulated GPU 122 of FIG. 2 may emulate the physical GPU 128.

In the computing system 100 of FIG. 4, the emulated GPU-B 422 may not emulate the physical GPU-A 128. Similarly, the emulated GPU-C 472 may not emulate the physical GPU-A 128, and the GPUs emulated by the emulated GPU-B 422 and the emulated GPU-C 472 may not be the same GPU. However, by using the driver-nesting approach shown, different graphics drivers can run on the emulated GPUs 122. Additional translation may be applied for, e.g., command formats and display attributes.

In some embodiments, the hybrid VM-container approach discussed above with reference to FIG. 3 and the nested driver approach discussed above with reference to FIG. 4 may be combined in a single computing system in any desired arrangement. More generally, any suitable ones of the embodiments disclosed herein may be combined with other embodiments disclosed herein to generate a computing system within the scope of the present disclosure.

Figure 5:
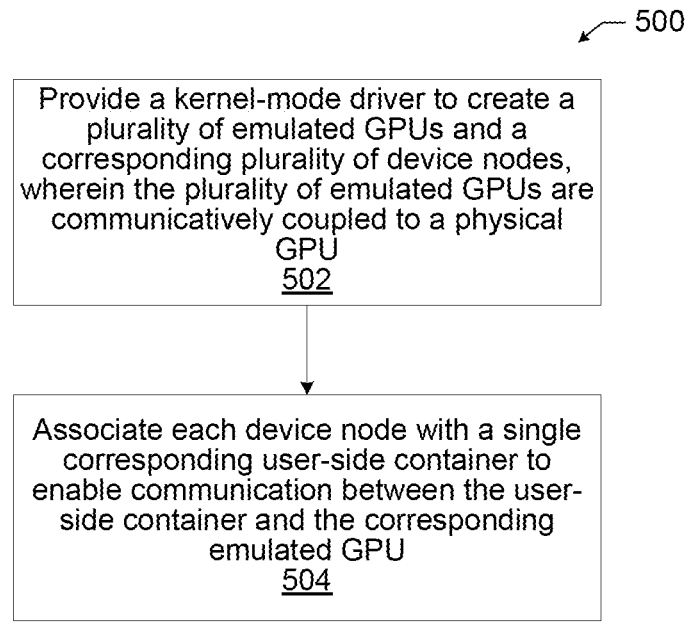
FIG. 5 is a flow diagram of a kernel-side method for enabling user-side containers to utilize resources of a physical GPU, in accordance with various embodiments.

FIG. 5 is a flow diagram of a kernel-side method 500 for enabling user-side containers to utilize resources of a physical GPU, in accordance with various embodiments. For ease of illustration, the method 500 may be discussed below with reference to the computing system 100. It may be recognized that, while the operations of the method 500 (and the other methods described herein) are arranged in a particular order and illustrated once each, in various embodiments, one or more of the operations may be repeated, omitted, or performed out of order. For illustrative purposes, operations of the method 500 may be described as performed by circuitry on the kernel side 104 of the computing system 100, but the method 500 may be performed by any suitably configured device.

At 502, circuitry on the kernel side 104 of the computing system 100 may provide a KMD (e.g., the KMD 114) to create a plurality of emulated GPUs (the emulated GPUs 122) and a corresponding plurality of device nodes (e.g., the device nodes 116). The plurality of emulated GPUs may be communicatively coupled to a physical GPU (e.g., the physical GPU 128).

At 504, circuitry on the kernel side 104 of the computing system 100 may associate each device node with a single corresponding user-side container (e.g., a container 106) to enable communication between the user-side container and the corresponding emulated GPU to utilize resources of the physical GPU.

Figure 6:
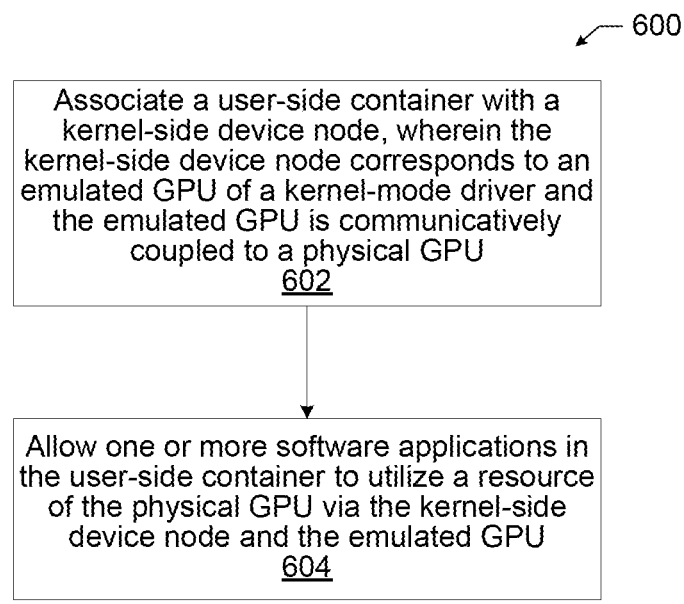
FIG. 6 is a flow diagram of a user-side method for enabling user-side containers to utilize resources of a physical GPU, in accordance with various embodiments.

FIG. 6 is a flow diagram of a user-side method 600 for enabling user-side containers to utilize resources of a physical GPU, in accordance with various embodiments. For ease of illustration, the method 600 may be discussed below with reference to the computing system 100. In particular, for illustrative purposes, operations of the method 600 may be described as performed by circuitry on the user side 102 of the computing system 100, but the method 600 may be performed by any suitably configured device.

At 602, circuitry on the user side 102 of the computing system 100 may associate a user-side container (e.g., a container 106) with a kernel-side device node (e.g., a device node 116). The kernel-side device node may correspond to an emulated GPU (e.g., an emulated GPU 122) of a KMD (e.g., the KMD 114) and the emulated GPU may be communicatively coupled to the physical GPU (e.g., the physical GPU 128).

At 604, circuitry on the user side 102 of the computing system 100 may allow one or more software applications (e.g., a software application 108) in the user-side container to utilize a resource of the physical GPU via the kernel-side device node and the emulated GPU.

Suitable ones of the embodiments disclosed herein may be readily applied to computing systems in which the physical GPU 128 is a single-root input/output virtualization (SR-IM)-capable GPU. Multiple emulated GPUs (e.g., the emulated GPUs 122) may be managed in the same manner as the virtual functions in an SR-IOV GPU system. Additionally, the emulated device approach disclosed herein may be extended beyond emulated GPUs, and may be used to containerize other subsystems, such as storage. This may remedy some of the deficiencies of existing approaches to managing these subsystems. For example, existing mount namespace techniques do not provide quantum control across containers, and extending a file system is a complex task. However, generating emulated storage devices may address these deficiencies and provide a straightforward solution.

Figure 7:
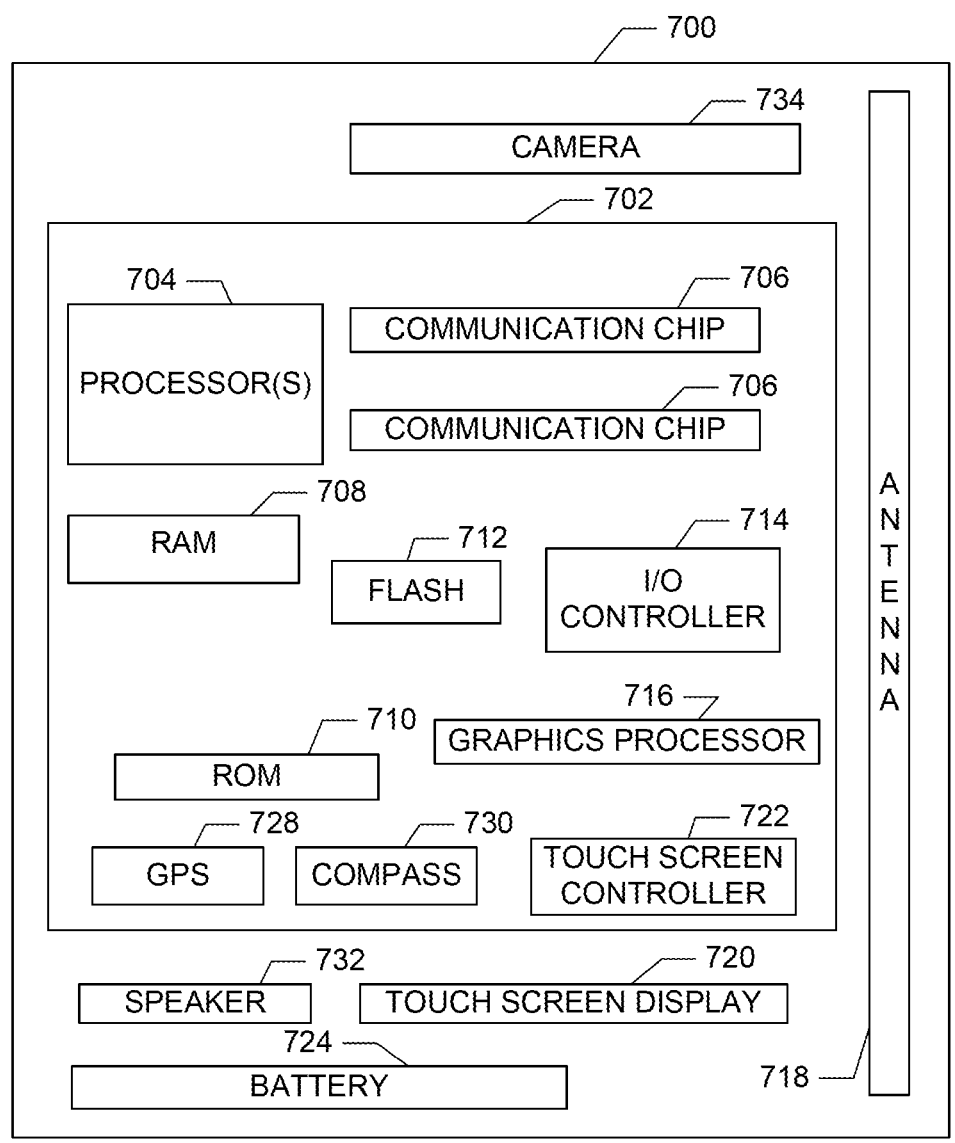
FIG. 7 is a block diagram of an example computing device that may be used to practice various embodiments described herein.

FIG. 7 is a block diagram of an example computing device 700, which may be suitable for practicing various disclosed embodiments. For example, the computing device 700 may serve as the computing system 100 or as the host computing device 144. In some embodiments, the components of the computing device 700 may be distributed across multiple physical device housings or locations, while in other embodiments, the components of the computing device 700 may be included in a single housing or location.

The computing device 700 may include a number of components, including one or more processor(s) 704 and at least one communication chip 706. In various embodiments, the processor 704 may include a processor core. In various embodiments, at least one communication chip 706 may also be physically and electrically coupled to the processor 704. In further implementations, the communication chip 706 may be part of the processor 704. In various embodiments, the computing device 700 may include a printed circuit board (PCB) 702. For these embodiments, the processor 704 and the communication chip 706 may be disposed thereon. In alternate embodiments, the various components may be coupled without the employment of the PCB 702.

Depending on its applications (e.g., container and GPU applications), the computing device 700 may include other components that may or may not be physically and electrically coupled to the PCB 702. These other components include, but are not limited to, random access memory (RAM) 708, volatile memory (such as dynamic RAM (DRAM)), non-volatile memory (e.g., read-only memory 710, also referred to as "ROM," one or more hard disk drives, one or more solid-state drives, one or more compact disc drives, and/or one or more digital versatile disc drives), flash memory 712, input/output (I/O) controller 714, a digital signal processor (not shown), a crypto processor (not shown), graphics processor 716 (e.g., the physical GPU 128), one or more antenna 718, touch screen display 720, touch screen controller 722, other displays (such as liquid-crystal displays, cathode-ray tube displays, and e-ink displays, not shown), battery 724, an audio codec (not shown), a video codec (not shown), global positioning system (GPS) device 728, compass 730, an accelerometer (not shown), a gyroscope (not shown), speaker 732, camera 734, and a mass storage device (such as hard disk drive, a solid state drive, compact disk (CD), digital versatile disk (DVD)) (not shown), any other desired sensors (not shown) and so forth. In various embodiments, the processor 704 may be integrated on the same die with other components to form a System on Chip (SoC). Any of the memory devices discussed herein may include any one or more of the memory devices illustrated in FIG. 7 or discussed herein with reference to FIG. 7.

In various embodiments, volatile memory (e.g., RAM 708), non-volatile memory (e.g., ROM 710), flash memory 712, and the mass storage device may include instructions that, in response to execution by the one or more processor(s) 704, cause the computing device 700 to practice all or selected aspects of the processes described herein with reference to FIGS. 1-6. For example, one or more of the memory components, such as volatile memory (e.g., RAM 708), non-volatile memory (e.g., ROM 710), flash memory 712, and the mass storage device, may be computer readable media that include temporal and/or persistent (e.g., non-transitory) copies of instructions that, in response to execution by the one or more processor(s) 704, cause the computing device 700 to practice all or selected aspects of the processes described herein. Memory accessible to the computing device 700 may include one or more storage devices that are physically part of a device on which the computing device 700 is installed and/or one or more storage devices that are accessible by, but not necessarily a part of, the computing device 700. For example, a storage device may be accessed by the computing device 700 over a network via the communication chip 706. In some embodiments, the instructions may be embodied in a computer-readable transitory non-tangible medium, such as signals.

The communication chip 706 may enable wired and/or wireless communications for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE02.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, Wi-Fi, Long Term Evolution (LTE), derivatives thereof, as well as any other wireless protocols that are designated as 2G, 3G, 4G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a wearable device, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 700 may be any other electronic device that processes data.

The following paragraphs describe examples of various embodiments.

Example 1 is a computing system, including: a physical graphics processing unit, GPU; and kernel-mode driver circuitry, to communicatively couple with the physical GPU, to create a plurality of emulated GPUs and a corresponding plurality of device nodes, wherein each device node is to be associated with a single corresponding user-side container to enable communication between the user-side container and the corresponding emulated GPU.

Example 2 may include the subject matter of Example 1, and may further specify that each of the emulated GPUs is to emulate the physical GPU.

Example 3 may include the subject matter of any of Examples 1-2, and may further specify that each user-side container includes a user-mode driver to communicate with the corresponding emulated GPU via the corresponding device node.

Example 4 may include the subject matter of Example 3, and may further specify that each user-side container includes one or more software applications in communication with the user-mode driver, and each of the one or more software applications is to utilize a resource of the physical GPU.

Example 5 may include the subject matter of any of Examples 1-4, and may further specify that the kernel-mode driver circuitry includes a display manager to couple with frame buffers of each of the plurality of user-side containers to selectively bring different ones of the frame buffers to a control path for the physical GPU.

Example 6 may include the subject matter of any of Examples 1-5, and may further specify that the kernel-mode driver circuitry further includes a scheduler, and the scheduler is to communicate with the plurality of emulated GPUs and the physical GPU.

Example 7 may include the subject matter of Example 6, and may further specify that the scheduler is to enforce a quality of service policy on use of the physical GPU by the emulated GPUs.

Example 8 may include the subject matter of any of Examples 6-7, and may further specify that the scheduler is to enforce a secure isolation policy for the emulated GPUs.

Example 9 may include the subject matter of any of Examples 1-8, and may further include a graphics memory partitioned among the plurality of emulated GPUs.

Example 10 may include the subject matter of Example 9, and may further specify that the graphics memory is to be utilized for pixel loading or as a write command buffer.

Example 11 may include the subject matter of any of Examples 1-10, and may further specify that an emulated GPU is to support a first set of GPU features, the physical GPU supports a second set of GPU features, and the first set is a proper subset of the second set.

Example 12 may include the subject matter of any of Examples 1-10, and may further include: a hypervisor, coupled to one of the plurality of emulated GPUs; and a virtual machine, running on the hypervisor, to communicate with the one of the plurality of emulated GPUs.

Example 13 may include the subject matter of Example 12, and may further specify that the virtual machine includes a kernel-mode GPU driver and a user-mode GPU driver.

Example 14 may include the subject matter of any of Examples 1-13, and may further specify that a first emulated GPU does not emulate the physical GPU, a first device node is associated with the first emulated GPU, the kernel-mode driver circuitry is first kernel-mode driver circuitry, and that the computing system further includes second kernel-mode driver circuitry, arranged such that the second kernel-mode driver circuitry is disposed between a user-mode driver circuitry and the first kernel-mode driver circuitry in a communication pathway.

Example 15 may include the subject matter of Example 14, and may further include a first user-side container including a user-mode driver to communicate with the second kernel-mode driver circuitry.

Example 16 is one or more computer readable media having instruction thereon that, in response to execution by one or more processing devices of a computing system, cause the computing system to: provide a kernel-mode driver to create a plurality of emulated graphics processing units, GPUs, and a corresponding plurality of device nodes, wherein the plurality of emulated GPUs are communicatively coupled to a physical GPU; and associate each device node with a single corresponding user-side container to enable communication between the user-side container and the corresponding emulated GPU to utilize resources of the physical GPU.

Example 17 may include the subject matter of Example 16, and may further specify that each of the emulated GPUs is to emulate the physical GPU.

Example 18 may include the subject matter of any of Examples 16-17, and may further specify that each user-side container includes a user-mode driver to communicate with the corresponding emulated GPU via the corresponding device node.

Example 19 may include the subject matter of Example 18, and may further specify that each user-side container includes one or more software applications in communication with the user-mode driver, and each of the one or more software applications is to utilize a resource of the physical GPU.

Example 20 may include the subject matter of any of Examples 16-19, and may further specify that the instructions are further to, upon execution by the one or more processing devices of the computing system, cause the computing system to: couple with frame buffers of each of the plurality of user-side containers to selectively bring different ones of the frame buffers to a control path for the physical GPU.

Example 21 may include the subject matter of any of Examples 16-20, and may further specify that the instructions are further to, upon execution by the one or more processing devices of the computing system, cause the computing system to: provide a scheduler to communicate with the plurality of emulated GPUs and the physical GPU.

Example 22 may include the subject matter of Example 21, and may further specify that the scheduler is to enforce a quality of service policy on use of the physical GPU by the emulated GPUs.

Example 23 may include the subject matter of any of Examples 21-22, and may further specify that the scheduler is to enforce a secure isolation policy for the emulated GPUs.

Example 24 may include the subject matter of any of Examples 16-23, and may further specify that the instructions are further to, upon execution by the one or more processing devices of the computing system, cause the computing system to: partition a graphics memory among the plurality of emulated GPUs.

Example 25 may include the subject matter of Example 24, wherein the graphics memory is to be utilized for pixel loading or as a write command buffer.

Example 26 may include the subject matter of any of Examples 16-25, and may further specify that an emulated GPU is to support a first set of GPU features, the physical GPU supports a second set of GPU features, and the first set is a proper subset of the second set.

Example 27 may include the subject matter of any of Examples 16-26, and may further specify that the instructions are further to, upon execution by the one or more processing devices of the computing system, cause the computing system to: create a second emulated GPU communicatively coupled to the physical GPU; and associate the second emulated GPU with a virtual machine to enable communication between the virtual machine and the corresponding emulated GPU.

Example 28 may include the subject matter of Example 27, and may further specify that the virtual machine includes a kernel-mode GPU driver and a user-mode GPU driver.

Example 29 may include the subject matter of any of Examples 16-28, and may further specify that a first emulated GPU does not emulate the physical GPU, the first emulated GPU is associated with a first device node, the kernel-mode driver is a first kernel-mode driver, and the instructions are further to, upon execution by the one or more processing devices of the computing system, cause the computing system to: provide a second kernel-mode driver, arranged such that the second kernel-mode driver is disposed between a user-mode driver in a user-side container and the first kernel-mode driver in a communication pathway.

Example 30 may include the subject matter of Example 29, and may further specify that a first user-side container includes a user-mode driver to communicate with the second kernel-mode driver.

Example 31 is one or more computer readable media having instruction thereon that, in response to execution by one or more processing devices of a computing system, cause the computing system to: associate a user-side container with a kernel-side device node, wherein the kernel-side device node corresponds to an emulated graphics processing unit, GPU, of a kernel-mode driver and the emulated GPU is communicatively coupled to a physical GPU; and allow one or more software applications in the user-side container to utilize a resource of the physical GPU via the kernel-side device node and the emulated GPU.

Example 32 may include the subject matter of Example 31, and may further specify that each of the emulated GPUs is to emulate the physical GPU.

Example 33 may include the subject matter of any of Examples 31-32, and may further specify that the kernel-mode driver includes a display manager to couple with a frame buffer of the user-side container to selectively bring the frame buffer to a control path for the physical GPU.

Example 34 may include the subject matter of any of Examples 31-33, and may further specify that the kernel-mode driver includes a scheduler, and the scheduler is to communicate with the emulated GPU and the physical GPU.

Example 35 may include the subject matter of Example 34, and may further specify that the scheduler is to enforce a quality of service policy on use of the physical GPU by the emulated GPU.

Example 36 may include the subject matter of any of Examples 34-35, and may further specify that the scheduler is to enforce a secure isolation policy for the emulated GPU.

Example 37 may include the subject matter of any of Examples 34-36, and may further specify that the emulated GPU is to support a first set of GPU features, the physical GPU supports a second set of GPU features, and the first set is a proper subset of the second set.

Example 38 may include the subject matter of any of Examples 31-37, and may further specify that: the emulated GPU does not emulate the physical GPU; the kernel-mode driver is a first kernel-mode driver; as part of allowance of one or more software applications in the user-side container to utilize a resource of the physical GPU via the kernel-side device node and the emulated GPU, allow one or more software applications in the user-side container to utilize the resource of the physical GPU via the kernel-side device node, the emulated GPU, and a second kernel-mode driver; and the device node is disposed between the second kernel-mode driver and the emulated GPU in a communication pathway.

Example 39 may include the subject matter of Example 38, and may further specify that the user-side container includes a user-mode driver to communicate with the second kernel-mode driver.

Example 40 is a method for enabling a plurality of user-side containers to utilize resources of a physical graphics processing unit, GPU, including: providing a kernel-mode driver to create a plurality of emulated GPUs and a corresponding plurality of device nodes, wherein the plurality of emulated GPUs are communicatively coupled to a physical GPU; and associating each device node with a single corresponding user-side container to enable communication between the user-side container and the corresponding emulated GPU to utilize resources of the physical GPU.

Example 41 may include the subject matter of Example 40, and may further specify that each of the emulated GPUs is to emulate the physical GPU.

Example 42 may include the subject matter of any of Examples 40-41, and may further specify that each user-side container includes a user-mode driver to communicate with the corresponding emulated GPU via the corresponding device node.

Example 43 may include the subject matter of Example 42, and may further specify that each user-side container includes one or more software applications in communication with the user-mode driver, and each of the one or more software applications is to utilize a resource of the physical GPU.

Example 44 may include the subject matter of any of Examples 40-43, and may further include coupling with frame buffers of each of the plurality of user-side containers to selectively bring different ones of the frame buffers to a control path for the physical GPU.

Example 45 may include the subject matter of any of Examples 40-44, and may further include providing a scheduler to communicate with the plurality of emulated GPUs and the physical GPU.

Example 46 may include the subject matter of Example 45, and may further specify that the scheduler is to enforce a quality of service policy on use of the physical GPU by the emulated GPUs.

Example 47 may include the subject matter of any of Examples 45-46, and may further specify that the scheduler is to enforce a secure isolation policy for the emulated GPUs.

Example 48 may include the subject matter of any of Examples 40-47, and may further include partitioning a graphics memory among the plurality of emulated GPUs.

Example 49 may include the subject matter of Example 48, and may further specify that the graphics memory is to be utilized for pixel loading or as a write command buffer.

Example 50 may include the subject matter of any of Examples 40-49, and may further specify that an emulated GPU is to support a first set of GPU features, the physical GPU supports a second set of GPU features, and the first set is a proper subset of the second set.

Example 51 may include the subject matter of any of Examples 40-50, and may further include: creating a second emulated GPU communicatively coupled to the physical GPU; and associating the second emulated GPU with a virtual machine to enable communication between the virtual machine and the corresponding emulated GPU.

Example 52 may include the subject matter of Example 51, and may further specify that the virtual machine includes a kernel-mode GPU driver and a user-mode GPU driver.

Example 53 may include the subject matter of any of Examples 40-52, and may further specify that a first emulated GPU does not emulate the physical GPU, the first emulated GPU is associated with a first device node, the kernel-mode driver is a first kernel-mode driver, and that the method further includes: providing a second kernel-mode driver, arranged such that the second kernel-mode driver is disposed between a user-mode driver in a user-side container and the first kernel-mode driver in a communication pathway.

Example 54 may include the subject matter of Example 53, and may further specify that a first user-side container includes a user-mode driver to communicate with the second kernel-mode driver.

Example 55 is a method for enabling a user-side container to utilize resources of a physical graphics processing unit, GPU, including: associating a user-side container with a kernel-side device node, wherein the kernel-side device node corresponds to an emulated GPU of a kernel-mode driver and the emulated GPU is communicatively coupled to a physical GPU; and allowing one or more software applications in the user-side container to utilize a resource of the physical GPU via the kernel-side device node and the emulated GPU.

Example 56 may include the subject matter of Example 55, wherein each of the emulated GPUs is to emulate the physical GPU.

Example 57 may include the subject matter of any of Examples 55-56, and may further specify that the kernel-mode driver includes a display manager to couple with a frame buffer of the user-side container to selectively bring the frame buffer to a control path for the physical GPU.

Example 58 may include the subject matter of any of Examples 55-57, and may further specify that the kernel-mode driver includes a scheduler, and the scheduler is to communicate with the emulated GPU and the physical GPU.

Example 59 may include the subject matter of Example 58, and may further specify that the scheduler is to enforce a quality of service policy on use of the physical GPU by the emulated GPU.

Example 60 may include the subject matter of any of Examples 58-59, and may further specify that the scheduler is to enforce a secure isolation policy for the emulated GPU.

Example 61 may include the subject matter of any of Examples 58-60, and may further specify that the emulated GPU is to support a first set of GPU features, the physical GPU supports a second set of GPU features, and the first set is a proper subset of the second set.

Example 62 may include the subject matter of any of Examples 55-61, and may further specify that: the emulated GPU does not emulate the physical GPU; the kernel-mode driver is a first kernel-mode driver; as part of allowing one or more software applications in the user-side container to utilize a resource of the physical GPU via the kernel-side device node and the emulated GPU, allowing one or more software applications in the user-side container to utilize the resource of the physical GPU via the kernel-side device node, the emulated GPU, and a second kernel-mode driver; and the second kernel-mode driver is disposed between a user-mode driver and the first kernel-mode driver in a communication pathway.

Example 63 may include the subject matter of Example 62, wherein the user-side container includes a user-mode driver to communicate with the second kernel-mode driver.

Example 64 is one or more computer readable media having instructions thereon that, in response to execution by one or more processing devices of a computing system, cause the computing system to perform the method of any of Examples 40-63.

Example 65 is an apparatus comprising means for performing the method of any of Examples 40-63.

What is claimed is:

1. A computing system, comprising:
   a physical graphics processing unit, GPU; and
   kernel-mode driver circuitry, to communicatively couple with the physical GPU, to create a plurality of emulated GPUs and a corresponding plurality of device nodes, wherein each device node is to be associated with a single corresponding user-side container to enable communication between the user-side container and the corresponding emulated GPU;
   wherein an emulated GPU is to support a first set of GPU features, the physical GPU supports a second set of GPU features, and the first set is a proper subset of the second set.

2. The computing system of claim 1, wherein each of the emulated GPUs is to emulate the physical GPU.

3. The computing system of claim 1, wherein each user-side container includes a user-mode driver to communicate with the corresponding emulated GPU via the corresponding device node.

4. The computing system of claim 3, wherein each user-side container includes one or more software applications in communication with the user-mode driver, and each of the one or more software applications is to utilize a resource of the physical GPU.

5. The computing system of claim 1, wherein the kernel-mode driver circuitry further includes a scheduler, and the scheduler is to communicate with the plurality of emulated GPUs and the physical GPU.

6. One or more non-transitory computer readable media having instruction thereon that, in response to execution by one or more processing devices of a computing system, cause the computing system to:
   provide a kernel-mode driver to create a plurality of emulated graphics processing units, GPUs and a corresponding plurality of device nodes, wherein the plurality of emulated GPUs are communicatively coupled to a physical GPU; and
   associate each device node with a single corresponding user-side container to enable communication between the user-side container and the corresponding emulated GPU to utilize resources of the physical GPU;
   wherein a first emulated GPU does not emulate the physical GPU, the first emulated GPU is associated with a first device node, the kernel-mode driver is a first kernel-mode driver, and the instructions are further to, upon execution by the one or more processing devices of the computing system, cause the computing system to:
   provide a second kernel-mode driver, arranged such that the second kernel-mode driver is disposed between a user-mode driver in a user-side container and the first kernel-mode driver in a communication pathway.

7. The one or more non-transitory computer readable media of claim 6, wherein each of the emulated GPUs is to emulate the physical GPU.

8. The one or more computer readable media of claim 6, wherein each user-side container includes a user-mode driver to communicate with the corresponding emulated GPU via the corresponding device node.

9. The one or more non-transitory computer readable media of claim 8, wherein each user-side container includes one or more software applications in communication with the user-mode driver, and each of the one or more software applications is to utilize a resource of the physical GPU.

10. The one or more non-transitory computer readable media of claim 6, wherein the instructions are further to, upon execution by the one or more processing devices of the computing system, cause the computing system to:
    provide a scheduler to communicate with the plurality of emulated GPUs and the physical GPU.

11. The one or more non-transitory computer readable media of claim 10, wherein the scheduler is to enforce a quality of service policy on use of the physical GPU by the emulated GPUs.

12. The one or more non-transitory computer readable media of claim 10, wherein the scheduler is to enforce a secure isolation policy for the emulated GPUs.

13. The one or more non-transitory computer readable media of claim 6, wherein the instructions are further to, upon execution by the one or more processing devices of the computing system, cause the computing system to:
    partition a graphics memory among the plurality of emulated GPUs.

14. The one or more non-transitory computer readable media of claim 13, wherein the graphics memory is to be utilized for pixel loading or as a write command buffer.

15. The one or more non-transitory computer readable media of claim 6, wherein the instructions are further to, upon execution by the one or more processing devices of the computing system, cause the computing system to:

create a second emulated GPU communicatively coupled to the physical GPU; and associate the second emulated GPU with a virtual machine to enable communication between the virtual machine and the corresponding emulated GPU.

16. The one or more non-transitory computer readable media of claim 15, wherein the virtual machine includes a kernel-mode GPU driver and a user-mode GPU driver.

17. The one or more non-transitory computer readable media of claim 6, wherein a first user-side container includes a user-mode driver to communicate with the second kernel-mode driver.

18. One or more non-transitory computer readable media having instruction thereon that, in response to execution by one or more processing devices of a computing system, cause the computing system to:

associate a user-side container with a kernel-side device node, wherein the kernel-side device node corresponds to an emulated graphics processing unit, GPU, of a kernel-mode driver and the emulated GPU is communicatively coupled to a physical GPU; and allow one or more software applications in the user-side container to utilize a resource of the physical GPU via the kernel-side device node and the emulated GPU;

wherein the kernel-mode driver includes a display manager to couple with a frame buffer of the user-side container to selectively bring the frame buffer to a control path for the physical GPU.

19. The one or more non-transitory computer readable media of claim 18, wherein each of the emulated GPUs is to emulate the physical GPU.

20. The one or more non-transitory computer readable media of claim 18, wherein the kernel-mode driver includes a scheduler, and the scheduler is to communicate with the emulated GPU and the physical GPU.

21. The one or more non-transitory computer readable media of claim 20, wherein the emulated GPU is to support a first set of GPU features, the physical GPU supports a second set of GPU features, and the first set is a proper subset of the second set.

22. The one or more non-transitory computer readable media of claim 18, wherein:

the emulated GPU does not emulate the physical GPU;

the kernel-mode driver is a first kernel-mode driver;

as part of allowance of one or more software applications in the user-side container to utilize a resource of the physical GPU via the kernel-side device node and the emulated GPU, allow one or more software applications in the user-side container to utilize the resource of the physical GPU via the kernel-side device node, the emulated GPU, and a second kernel-mode driver; and the device node is disposed between the second kernel-mode driver and the emulated GPU in a communication pathway.

* * * * *